United States Patent [19]

Mathers et al.

[11] 3,865,395
[45] Feb. 11, 1975

[54] SUSPENSION UNITS FOR MULTIPLE-AXLE VEHICLES

[75] Inventors: Robert Valentine Mathers, Chester; Frederick Thompson, Marford, near Wrexham, both of England

[73] Assignee: Rubery Owen-Rockwell Limited, Staffordshire, England

[22] Filed: Aug. 6, 1973

[21] Appl. No.: 385,881

[30] Foreign Application Priority Data
Aug. 12, 1972 Great Britain.................... 37695/72

[52] U.S. Cl........................................... 280/104.5 B
[51] Int. Cl............................................ B62d 21/00
[58] Field of Search .............................. 280/104.5 B

[56] References Cited
UNITED STATES PATENTS
2,577,322  12/1951  Frazier.......................... 280/104.5 B
R23,252   8/1950   Frazier.......................... 280/104.5 B

*Primary Examiner*—M. Henson Wood, Jr.
*Assistant Examiner*—Gene A. Church
*Attorney, Agent, or Firm*—Kemon, Palmer & Estabrook

[57] ABSTRACT

In a suspension unit for a multiple-axle vehicles incorporating leaf springs, the adjacent ends of the springs for adjacent axles being received in opposite ends of an equaliser beam which is mounted on the vehicle frame for angular movement about an axis parallel to the axles and said beam having at each end an integral bearer pad providing a bearing surface for the end of a spring, readily renewable members providing bearing surfaces for engagement by the springs are fitted to the bearer pads.

3 Claims, 5 Drawing Figures

SUSPENSION UNITS FOR MULTIPLE-AXLE VEHICLES

This invention relates to suspension units for multiple-axle vehicles incorporating leaf springs.

In such units it is common practice for the adjacent ends of the springs for adjacent axles to be received in opposite ends of an equaliser beam which is mounted on the frame or chassis for angular movement about an axis parallel to the axles. The object of this arrangement is to distribute the load between the axles, load being transferred through the equalising beam from a heavily loaded axle to a less heavily loaded one.

The equaliser beam incorporates at each end an integral bearer pad of which the under surface provides a bearing surface for the end of a spring.

When the vehicle is in motion the spring deflects and there is relative movement in a fore-and-aft direction between the spring and the bearer pad, and wear of the pad takes place. In time the wear may become sufficient to require dismantling of the unit to allow the equaliser beams to be replaced or the worn surfaces of the bearer pads built up.

According to our invention, in a suspension unit as described above the bearer pads are fitted with readily renewable wearing surfaces.

Such surfaces may, for example, be formed by clips of spring steel which are of such a form that they can be snapped on to or removed from the bearer pads without having to dismantle any part of the suspension.

When the vehicle is in motion the relative movement which causes wear is between the spring and the clip, and a worn clip can be readily replaced whenever necessary.

One example of our invention is illustrated in the accompanying drawings in which:

FIG. 3 is a section on the line 3—3 of FIG. 2,

Figure 1:
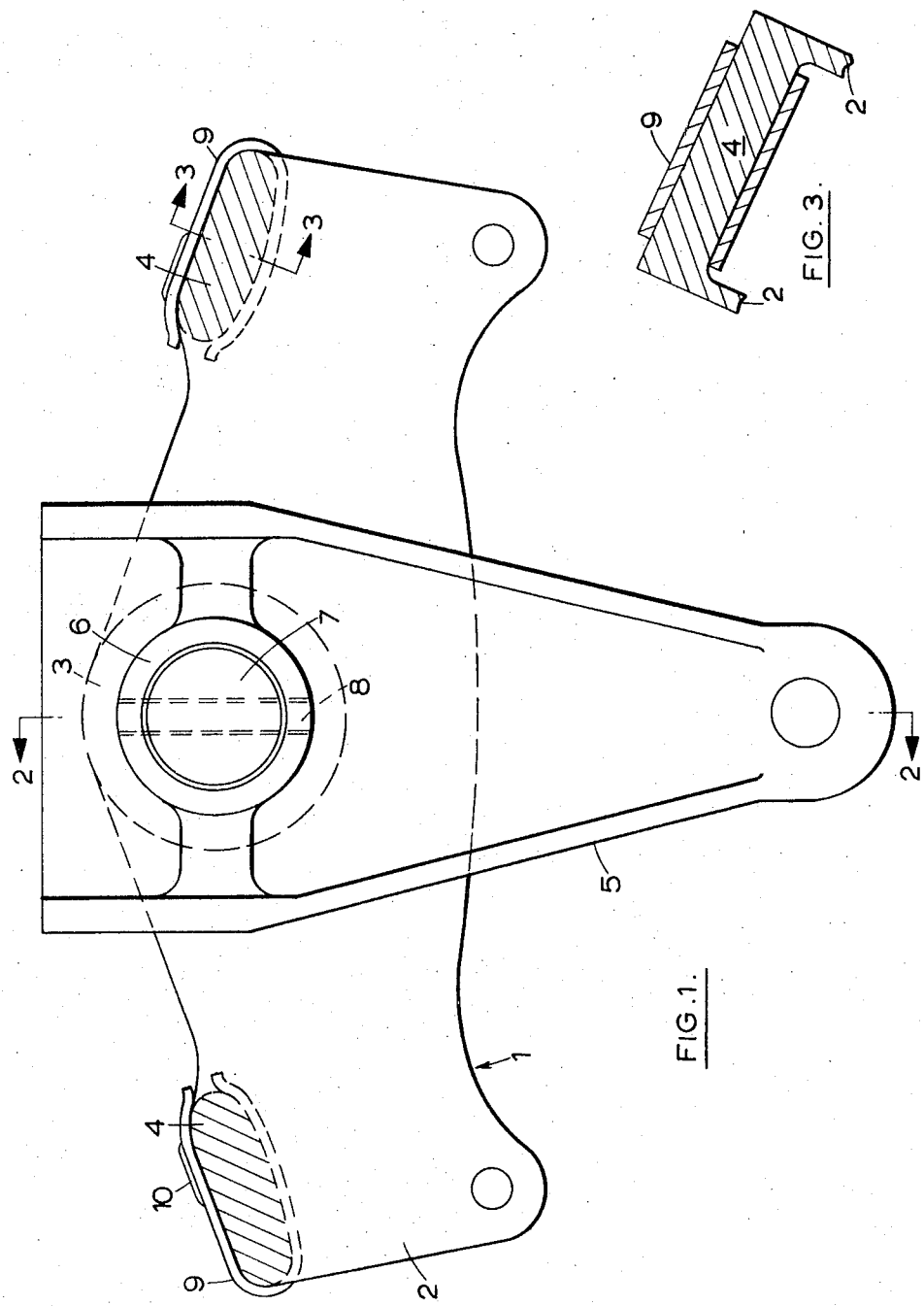
FIG. 1 is a side view of an equaliser beam for a twin axle suspension unit.
Figure 2:
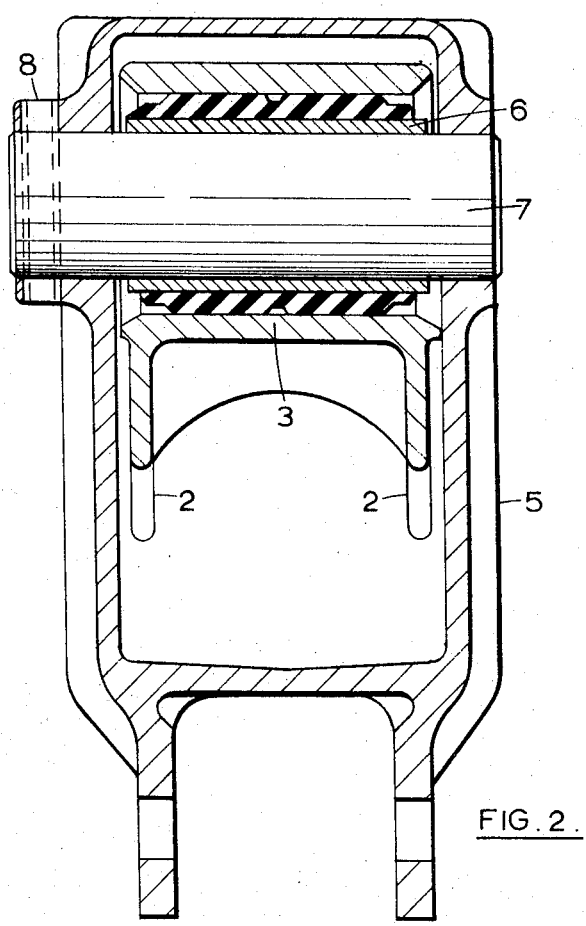
FIG. 2 is a section on the line 2—2 of FIG. 1.

The equaliser beam 1 shown in FIGS. 1 to 3 is a steel casting comprising two side members 2, 2 which are bridged at the centre by a bearing housing 3 and by an integral bearer pad 4 at each end.

The beam 1 is pivotally mounted in a hanger bracket 5 which is secured to the underside of a vehicle (not shown). Assembly of the beam 1 to the bracket 5 is completed by a bearing bush 6 in the bearing housing 3 and a shaft 7 which passes through the bush 6 and registering holes in the bracket 5. The shaft 7 is secured at one end in the bracket 5 by a pin 8. This is a well known construction in which adjacent ends of two leaf springs (not shown) bear against the under surfaces of the bearer pads 4.

Our invention consists in providing renewable wear pads for the bearer pads.

Each wear pad comprises a clip 9 of generally flattened C-shape made from spring steel and of such a form as to snap over and closely fit a bearer pad.

The suspension spring is in sliding engagement with the spring steel wear pad instead of engaging directly with the bearer pad and the wear pad can be readily pulled off when worn and replaced by a new one.

For this it is only necessary to jack up the appropriate axle or wheel to release the pressure of the spring concerned on its bearer pad.

When a standard suspension unit is fitted to a special purpose vehicle, for example a vehicle with small ground clearance, it may be desirable to provide stops on the equaliser beams co-operating with stops on the vehicle frame to limit the angular rocking movement of the equaliser beams.

Figure 4:
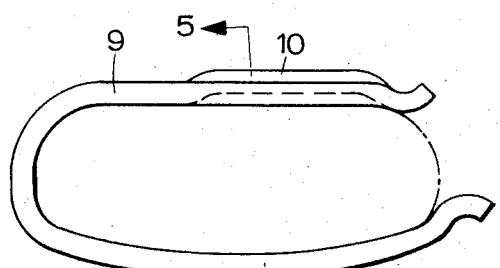
FIG. 4 is a side elevation of a wear pad.
Figure 5:
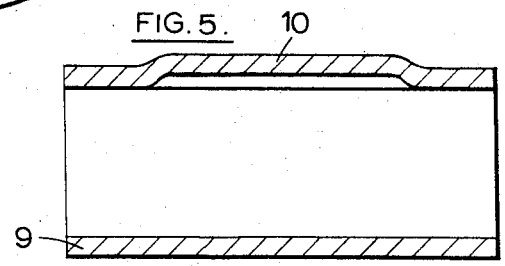
FIG. 5 is a section on the line 5—5 of FIG. 4.

The wear pads of our invention may serve as stops without any further modification of the standard suspension, the upper surfaces of the wear pads co-operating with parts of the vehicle frame. If the thickness of the spring steel from which the pads are formed is not sufficient for them to form stops the central parts of the upper limbs of the pads may be joggled as shown at 10 in FIGS. 4 and 5 to provide additional height.

We claim:

1. A suspension unit for multiple-axle vehicles incorporating leaf springs in which the adjacent ends of the springs for adjacent axles are received in opposite ends of an equalizer beam mounted on the frame of the vehicle for angular movement about an axis parallel to the axles, and the equalizer beam incorporates at opposite ends integral bearer pads provided with renewable wearing members for engagement by the springs, wherein said wearing members comprise clips formed of spring steel and adapted to be snapped on to the bearer pads.

2. A suspension unit for multiple-axle vehicles as in claim 1 wherein each clip is of flattened C outline.

3. A suspension unit for multiple-axle vehicles as in claim 1 wherein said renewable members incorporate joggled portions adapted to form stops for co-operation with parts of the vehicle frame to limit angular rocking movement of the equalizer beam.

* * * * *